April 20, 1954     J. W. PARKER     2,676,276
HIGH-SPEED SPINDLE
Filed Aug. 29, 1952
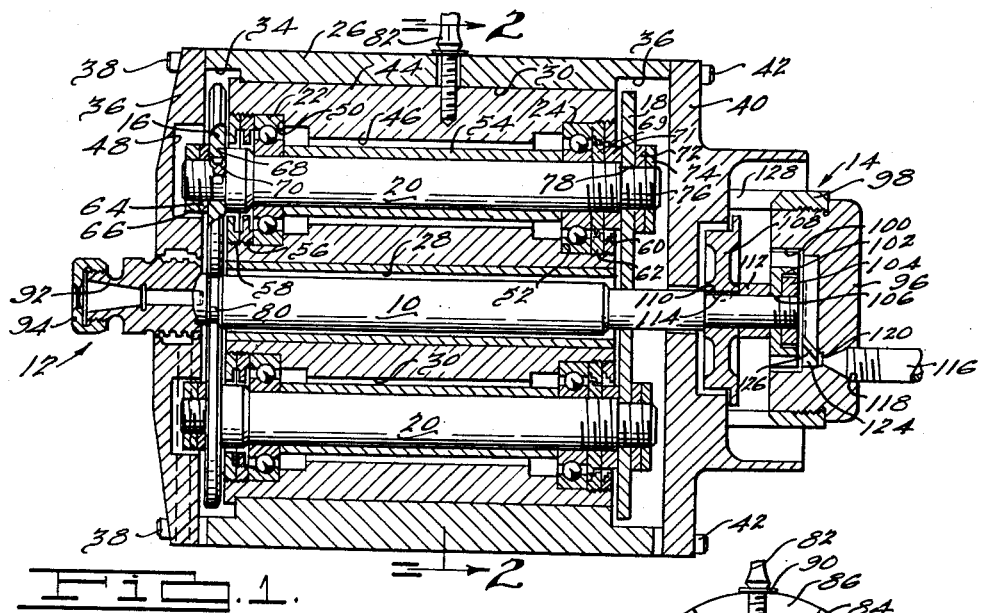
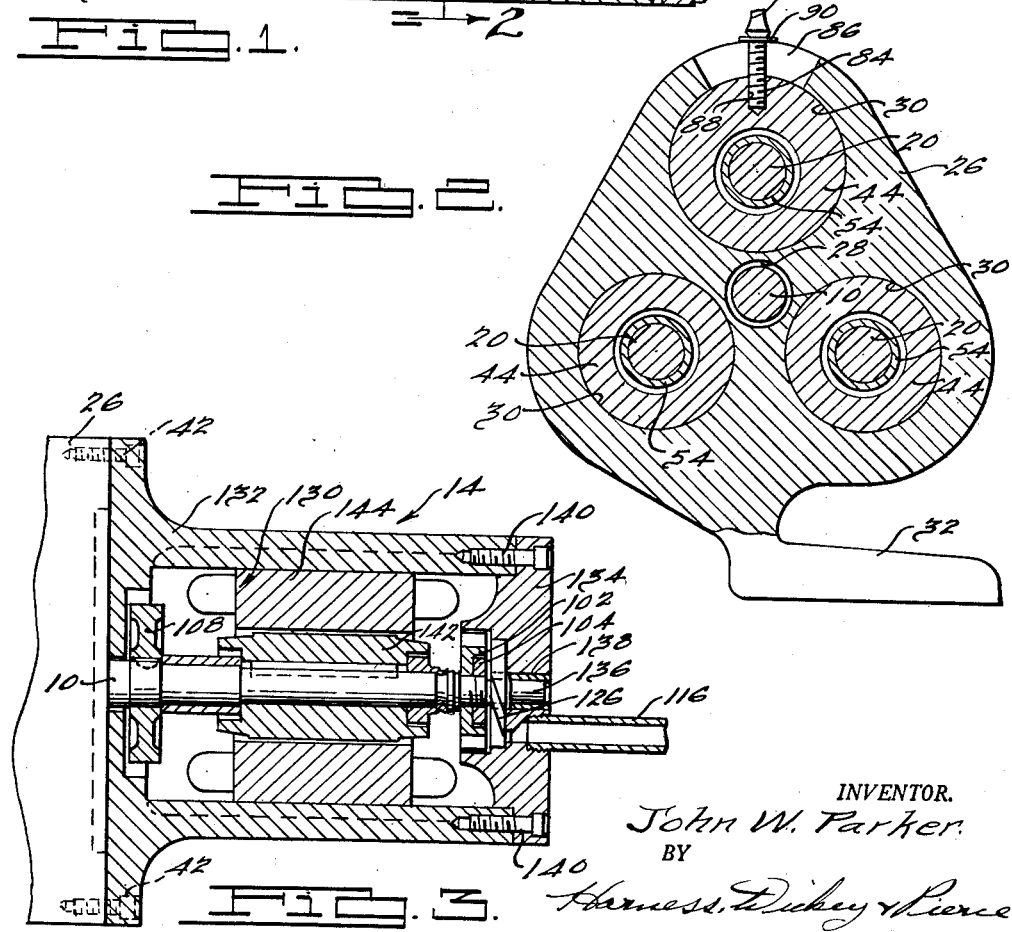
INVENTOR.
John W. Parker.
BY
Harness, Dickey & Pierce
ATTORNEYS.

Patented Apr. 20, 1954

2,676,276

UNITED STATES PATENT OFFICE 2,676,276

HIGH-SPEED SPINDLE

John W. Parker, Grosse Pointe, Mich.

Application August 29, 1952, Serial No. 307,008

5 Claims. (Cl. 310—41)

This invention relates to high-speed, rotary driving mechanisms.

In certain types of machining operations such as grinding, milling, and boring, it is necessary to drive the tool at high rates of speed in the order of 100,000 R. P. M. However, conventional high-speed bearings will not stand up very long at such speeds. As a consequence, high rotational speeds of the order here contemplated simply cannot be employed; or, alternatively, it is necessary to replace bearings so frequently as to make the drive mechanism commercially impractical.

An important object of the present invention is to provide a high-speed drive mechanism having provision for attachment thereto of a cutting tool or the like and that is capable of being driven at speeds in the order of 100,000 R. P. M. or higher without undue wear or stress on the bearings or other rotary supporting parts of the mechanism.

Another object of the invention is to provide a high-speed drive mechanism in which the same shaft which carries the cutting tool is directly driven so that it is not necessary to drive the shaft through speed-change gears, thus avoiding lost motion, backlash, and other undesirable phenomena inherent in gear drives.

Still another object of the invention is to provide a high-speed rotary drive mechanism that is relatively simple in construction and efficient in operation.

Other objects and advantages of the invention will be apparent during the course of the following description.

In the drawing forming a part of the specification and wherein like numerals are employed to designate like parts throughout the same:

Fig. 1 is a longitudinal sectional view of a high-speed, rotary drive mechanism embodying the invention;

Fig. 2 is a transverse, sectional view taken on the line 2—2 of Fig. 1; and

Fig. 3 is a fragmentary, longitudinal sectional view of a modified drive means for the mechanism.

Considered in certain of its broader aspects, the mechanism of this invention comprises a rotatable drive shaft 10 having a chuck 12 on one end and a rotary drive means 14 on the opposite end thereof. The chuck 12 may be of any suitable or conventional construction and is merely intended to serve as a means for fastening a cutting tool such as a grinding wheel or drill to the shaft 10. Also, it is contemplated that any suitable means 14 that will rotatably drive the shaft 10 at sufficiently high speeds may be used.

According to the present invention, the shaft 10 is supported for rotation by forward disks 16 and rearward disks 18 on and rotatable with an annular series of spindles 20. Any desired number of the spindles 20 and associated disks 16 and 18 may be used. Three spindles 20 disposed in equi-spaced relation and concentrically around the shaft 10 are here shown, and each spindle carries one disk 16 and one disk 18. Also, it will be observed that each of the spindles 20 is rotatably supported by high-speed bearings 22 and 24.

The disks 16 and 18 are in pressed peripheral engagement with the shaft 10 and they mutually co-operate to support the latter for substantially frictionless and vibrationless rotation. Since the shaft 10 is directly rotatably driven, it in turn rotatably drives the supporting disks 16 and 18, and the disks in turn rotatably drive the spindles 20. However, inasmuch as the disks 16 are substantially larger in diameter than the shaft 10, the spindles 20 are driven at a much lower rate of speed than the shaft 10. Manifestly the particular speed ratio between the shaft 10 and the spindles 20 may vary, depending upon the relative diameters of the shaft 10 and disks 16 and 18. In actual practice, these diameters are proportioned so that the spindles 20 are driven at speeds well within the capacity of the supporting bearings 22 and 24. Manifestly, however, the shaft 10 itself may be driven at a rate of speed much higher than the capacity of the bearings 22 and 24.

From the foregoing it will be readily apparent that if the shaft 10 is rotatably driven at 100,000 R. P. M. and the ratio between the shaft and the disks 16 and 18 is 1:4, the spindles 20 rotate at 25,000 R. P. M. High-speed bearings readily available on the market will stand up almost indefinitely at the relatively lower speed referred to above, whereas the same bearings would last only a short time if they were required to directly support the more rapidly rotating shaft 10.

Considering the invention now in greater detail, it will be observed that the entire mechanism is contained within a single case or housing 26. This housing 26 individually supports the shaft 10 and each of the spindles 20. To this end, the housing 26 is provided with a central bore 28 through which the shaft 10 extends and surrounding substantially concentric bores 30 which receive the spindles 20 and their adjuncts. In order to assure maximum strength and rigidity, the housing 26 preferably is in the form of a solid casting as shown in the drawing, and it may conveniently be provided with any suitable mounting or base 32. Of course it will be readily appreciated that the base 32 may vary considerably in size and form, depending upon the particular use for which the mechanism is intended and depending upon the environment in which it ultimately is to be placed. The forward end of the housing 26 is formed with a recess 34 and the rearward end thereof is similarly recessed at 36. A front cover 38 is detachably fastened to the forward end of the housing 26 by screws 38, and a back cover 40 is similarly detachably fastened to the rearward end of the housing by screws 42. The central bore 28 which receives the shaft 10 extends entirely through the housing 26 and opens at the ends thereof into respective recesses 34 and 36. Similarly, the bores 30 extend entirely through the housing 26 and opposite ends of these bores also open into the recesses 34 and 36.

Each of the spindles 20 is similarly mounted for rotation in the housing 26, and a detailed description of but one therefore will suffice. Each individual spindle 20 and its disk assembly is disposed within and carried by a generally cylindrical body 44. The latter has a longitudinal passage 46 through which the spindle extends and, as clearly shown in the drawing, the opposite terminal portions of the spindle project from the body 44 and extend into the recesses 34 and 36. If necessary or desirable, the front cover 38 may be suitably recessed or cored out to accommodate the forwardly projecting end of the spindle 20. As shown in Fig. 1, the bearings 22 and 24 fit snugly in radially enlarged terminal portions of the passage 46. The outer races butt inwardly against radial shoulders 50 and 52 defined by the enlargements of the passage 46, and the inner races thereof are held apart by a spaced sleeve 54. Lock nuts 56 and 58 hold the front bearing 22 solidly against the shoulder 50, and lock nuts 60 and 62 hold the rear bearing 24 solidly against the shoulder 52. Manifestly, the bearings 22 and 24 support the spindle 20 for essentially frictionless rotation, and all of the spindles 20 are more or less equispaced with respect to each other and disposed generally concentrically around the shaft 10.

The forward disks 16 are all located in a single plane disposed transversely or at right angles to the shaft 10, and each disk is held on its respective shaft by a nut 64 and lock nut 66. In each instance, the nuts 64 and 66 clamp the disk 16, with which they are associated, solidly against a radial shoulder 68 on the spindle 20, and the disk is connected for mutual rotation with the spindle by a key 70. Each of the rear disks 18 is separated from the adjacent bearing 24 by oil-retaining and spacer members 69 and 71 and is clamped solidly against the spacer 71 by nuts 72 and 74 on the threaded terminal portion 76 of the spindle 20. Also, each disk 18 is fastened for mutual rotation with its respective spindle 20 by a key 78. All of the rearward disks 18 are located in a single plane disposed transversely to the shaft 10 in the same manner as the forward disks 16.

As suggested, all of the disks 16 and 18 peripherally engage the shaft 10; and inasmuch as the disks engage the shaft at a plurality of circumferentially and longitudinally spaced points, they confine the shaft and support it for relatively frictionless rotation. In this connection it will be observed that the disks 16 and 18 support the same shaft 10 spaced from the cylindrical wall of the bore 28 in which it is mounted. Also, it will be observed that the disks 16 and 18 are the only parts which engage the shaft 10, so that rotational friction is maintained at a minimum. In the form of the invention shown, the shaft 10 is formed adjacent the forward end thereof with an inwardly tapered peripheral groove 80 and the forward disks 16 have correspondingly tapered peripheral portions which enter into and snugly fit the groove 80. The tapered surfaces of the disks 16 ride on the correspondingly tapered surfaces of the groove 80 and the annular or peripheral surfaces thereof preferably are spaced at least slightly from the bottom of the groove 80. As the disks 16 and 18 are pressed against the shaft with some force, they mutually co-operate to prevent lateral movement of the shaft and the front disks 16 interengage with the groove 80 to hold the shaft against independent longitudinal movement.

In order to obtain proper initial engagement of the disks 16 and 18 with the shaft 10 and to compensate for manufacturing tolerances and wear which occurs in use, provision is made for adjusting at least one of the spindles 20 and its associated disks to and from the shaft. In the form of the invention here shown by way of illustration, only one of the spindles 20 is adjustable in this manner and adjustment is accomplished by making the passage 46 of the carrier body 44 which receives the spindle eccentric to the cylindrical outer surface of the carrier body and by mounting this particular carrier body for rotational adjustment in the bore 30 which receives it. The carrier body 44 is rotatably adjusted by a manually operable handle 82 having a threaded shank 84 which extends through a transversely elongated slot 86 in the housing 26 and into an internally threaded socket 88 provided in the body 44. A radial flange 90 on the handle bears downwardly against the housing 26 on opposite sides of the slot 86. Thus tightening of the shank 84 in the socket 88 pulls the flange 90 solidly against the housing to hold the carrier body 44 securely in a selected rotatably adjusted position. On the other hand, when the handle 82 is rotated to loosen the shank 84 in the socket 88, the flange 90 releases the housing 26 to permit rotational adjustment of the carrier body 44. As shown in Fig. 2, the outer surface of the housing at the slot 86 is concentric to the adjacent bore 30 so that the housing does not interfere with rotational adjustment of the carrier body 44.

As suggested, any suitable means may be provided on the forward end of the shaft 10 for securing a cutting tool to the shaft. In fact, it may be necessary to vary the form and construction of this means in particular instances, depending upon the nature of the tool to be driven and the nature of the operation to be performed by the tool. Thus, it is contemplated that any suitable or conventional fastening device or chuck be used on the shaft. A particular chucking device is shown in the drawing merely by way of example, and this device comprises a tapered hole 92 in the end of the shaft 10 and a cap 94 threaded on the terminal portion thereof. The chuck here shown is adapted for a relatively small grinding wheel (not shown) of conventional form.

The drive means 14 shown in Fig. 1 is an air motor and the particular construction shown is capable of rotatably driving the shaft 10 and a cutting tool attached thereto when under normal load at speeds in excess of 100,000 R. P. M. More particularly, the drive comprises a valve cover 96 threaded into an annular flange 98 on and extending outwardly from the rear cover 40 around and concentrical to the rearwardly extending end of the shaft 10. As clearly shown in the drawing, the flange 98 positions the valve cover 96 axially outwardly from the rearward end of shaft 10 and the plate has an inner central recess 100 which receives the end of the shaft. An impeller 102 adapted to be rotatably driven by a stream of air under pressure is fastened on the rearward end of the shaft 10 by a nut 104 and disposed within the recess 100, and a key 106 interconnects the impeller and the shaft for mutual rotation. A flywheel 108 also is mounted on the shaft 10 between the rear cover 40 and the impeller 102. The flywheel 108 abuts inwardly against a radial shoulder 110 on the shaft and the nut 104 acts through the impeller and a spacer 112 interposed between the impeller and the flywheel to hold the latter solidly against the shoulder. A key 114 interconnects the flywheel 108 and the shaft 10 for mutual rotation.

Air under pressure is delivered to the valve cover 96 from any suitable source through a tube or pipe 116. As shown in Fig. 1, the pipe 116 is screwed into an opening 118 provided in the valve cover 96. The inner end of the opening 118 is in the form of a relatively wide flattened orifice 120 and this orifice opens through the inner face of the valve cover 96 which is closed by an injector plate 124 pressed into the recess 100 and spaced outwardly from the impeller 102. The orifice 120 in turn communicates with a peripheral groove 126 in the injector plate 124 and the groove 126 extends obliquely toward the vanes of the impeller 102. Thus, air delivered under pressure to the valve plate 96 is directed angularly against the vanes of impeller 102 to rotatably drive the latter at relatively high speeds. This air passes between the vanes of the impeller and discharges through openings 128 in the supporting flange 98.

Fig. 3 shows a modified drive for the shaft 10 that may be used to advantage in certain instances. More particularly, the modified drive incorporates an electric motor with the air-driven impeller. It has the advantage over the drive first described, viz., the air-driven impeller per se, in that the drive shaft can be driven at a more constant, desired speed. The modified construction uses a high-cycle motor which serves as the principal prime mover for the drive shaft, and the air impeller functions as an auxiliary or initial actuator therefor. High-cycle motors of the type here under consideration cannot be used alone because they cannot be energized electrically when stationary without burning out the electrical windings and connections. However, if the part driven by the motor is first brought up to a predetermined relatively high rotational speed, the motor can then be energized without danger and it will thereafter continue to drive the member at a speed determined by the frequency characteristics of the motor and the load imposed on the driven part. Substantially any rotational speed can be obtained by varying the characteristics of the motor. It is proposed here to use the air-driven impeller to bring the drive shaft up to a predetermined, rotational speed at which the motor can be safely energized. After energization of the motor, the latter assumes driving control of the shaft and the air stream to the impeller is reduced so that it assists in driving the shaft only in a very minor secondary capacity and serves principally to cool the motor and its adjuncts and appurtenances. This particular combination of driving means has proved to be particularly and unexpectedly efficient and provides a novel and extremely beneficial means for driving a shaft or the like at a predetermined, relatively constant high speed.

As shown in the drawing, the modified drive consists of a high-cycle electric motor 128 on and fastened to the shaft between the flywheel 108 and the air-driven vane 102. In this construction the air-driven impeller 102 is first operated to bring the shaft 10 up to a predetermined rotational speed as suggested hereinabove and the electric motor 130 is thereafter utilized to increase the rotational speed of the shaft and to drive it at the relatively high speed. This form of the invention is substantially the same as the form first described except that the relatively small annular flange 128 is replaced by a longer and stronger flange 132. The latter obviously must be longer in order to accommodate the motor 130, and it must be made relatively stronger in order to support both the motor and the impeller 102. Also, by reason of the relatively greater length of the flange 132 it is desirable to provide an end cover 134 on the outer end of the flange and to provide the relatively longer terminal portion of the shaft 10 with an end journal 136 which is rotatably supported in a suitable outboard bearing 138. Screws 140 detachably fasten the end cover 134 to the flange 132. As shown, the rotor 142 of the motor 130 is fastened to the shaft 10 and the stator of the motor 144 is suitably secured to the stationary flange 132. Air is delivered to the impeller 102 and the latter is rotatably driven in the same manner as in the form of the invention first described.

It may thus be seen that I have achieved the objects of my invention. I have provided a high-speed drive mechanism that is relatively simple in construction and which supports a drive shaft for high-speed rotation without imposing undue or excessive stresses on the bearings which support the parts for rotation. I am able to utilize a direct drive to the main shaft which achieves maximum efficiency of operation with a minimum number of parts. By reason of the construction here employed, greater speeds of rotation are possible than heretofore and this advantage is coupled with longer bearing life expectancy. Heretofore it has been necessary to maintain the drive shaft as small as possible in diameter in order to maintain the surface speed of the shaft at a minimum and the necessity of using a small-diameter shaft has resulted in a structure that is mechanically weak and susceptible of destructive vibrations. The instant construction makes it possible to use relatively large-diameter main shafts without necessarily correspondingly increasing the wear on the supporting bearings and thus achieving rigidity and stability impossible in prior constructions.

Having thus described the invention, I claim:

1. A high-speed drive comprising a housing having a central bore and an annular series of bores around said central bore, a shaft in and projecting from the ends of said central bore, a plurality of cylindrical carriers disposed one in each of said annular series of bores and each provided with a longitudinal passage therein, spindles in and extending from the ends of said longitudinal passages, high-speed bearings supporting the spindles for rotation in said longitudinal passages, disks on the projecting portions of said spindles peripherally engaging and suporting said shaft for rotation, a primary drive means in the form of a high-cycle electric motor connected to the shaft to rotatably drive the same, and a secondary drive means in the form of an air-driven impeller also connected to the shaft to rotatably drive the same, said air-driven impeller being operative to rotatably drive the shaft initially so as to bring it up to a predetermined rotational speed at which the motor can be safely energized and thereafter operative to cool the motor and associated parts of the drive.

2. A high-speed drive comprising a rotatable shaft adapted to carry a part to be rotatably driven at relatively high speeds, a plurality of spindles disposed concentrically around said shaft, disks on and rotatable with said spindles peripherally engaging and supporting said shaft at circumferentially and longitudinally spaced points thereon, means supporting said spindles for rotation, means for moving at least one of said spindles to and from said shaft, a primary drive means in the form of a high-cycle electric motor connected to the shaft to rotatably drive the same, and a secondary drive means in the form of an air-driven impeller also connected to the shaft to rotatably drive the same, said air-driven impeller being operative to rotatably drive the shaft initially so as to bring it up to a predetermined rotational speed at which the motor can be safely energized and thereafter operative to cool the motor and associated parts of the drive.

3. A high-speed drive comprising a drive shaft having an annular, inwardly tapered groove in the periphery thereof, a plurality of spindles disposed concentrically around and parallel to said shaft, at least two longitudinally spaced sets of disks on and rotatable with said spindles, all of said disks peripherally engaging said shaft and supporting the same for rotation, the disks of one of said sets having radially outwardly tapered peripheral portions disposed in said annular groove whereby to hold said shaft and said spindles axially fixed with respect to each other, means supporting said spindles for rotation, a primary drive means in the form of a high-cycle electric motor connected to the shaft to rotatably drive the same, and a secondary drive means in the form of an air-driven impeller also connected to the shaft to rotatably drive the same, said air-driven impeller being operative to rotate the shaft initially so as to bring it up to a predetermined rotational speed at which the motor can be safely energized and thereafter operative to cool the motor and associated parts of the drive.

4. A high-speed drive comprising a rotatable shaft adapted to carry a part to be rotatably driven at relatively high speeds, a plurality of spindles disposed concentrically around said shaft, disks on and rotatable with said spindles peripherally engaging and supporting said shaft at circumferentially and longitudinally spaced points thereon, bearings on said spindles, means carrying said bearings holding the latter and the spindles associated therewith as well as said shaft in predetermined spatial relation with respect to each other, means for moving at least one of said spindles and the bearings associated therewith as a unit to and from said shaft whereby to regulate the contact pressure of said disks on said shaft, a primary drive means in the form of a high-cycle electric motor connected to the shaft to rotatably drive the same, and a secondary drive means in the form of an air-driven impeller also connected to the shaft to rotate the same, said air-driven impeller being operative to rotate the shaft initially so as to bring it up to a predetermined rotational speed at which the motor can be safely energized and thereafter operative to cool the motor and associated parts of the drive.

5. A high-speed drive comprising a rotatable shaft adapted to carry a part to be rotatably driven at relatively high speeds, a plurality of rotatable spindles disposed concentrically around said shaft, disks on and rotatable with said spindles peripherally engaging and supporting such shaft at circumferentially and longitudinally spaced points thereon, a primary drive means in the form of a high-cycle electric motor connected to the shaft to rotatably drive the same, and a secondary drive means also connected to the shaft to rotatably drive the same initially so as to bring it up to a predetermined rotational speed at which the motor can be safely energized.

References Cited in the file of this patent

UNITED STATES PATENTS

| Number | Name | Date |
|---|---|---|
| 1,748,174 | Hirvonen | Feb. 25, 1930 |
| 1,827,968 | Bryant | Oct. 20, 1931 |
| 2,442,202 | Hughes-Caley | May 25, 1948 |

FOREIGN PATENTS

| Number | Country | Date |
|---|---|---|
| 267,590 | Italy | Sept. 12, 1929 |
| 964,750 | France | Aug. 23, 1950 |